United States Patent
McGowan

(10) Patent No.: US 10,033,992 B1
(45) Date of Patent: Jul. 24, 2018

(54) GENERATING A 3D VIDEO OF AN EVENT USING CROWD SOURCED DATA

(71) Applicant: Google Inc., Mountain View, CA (US)

(72) Inventor: John McGowan, Broomfield, CO (US)

(73) Assignee: Google LLC, Mountain View, CA (US)

(*) Notice: Subject to any disclaimer, the term of this patent is extended or adjusted under 35 U.S.C. 154(b) by 226 days.

(21) Appl. No.: 14/481,120

(22) Filed: Sep. 9, 2014

(51) Int. Cl.
*H04N 7/48* (2006.01)
*H04N 7/18* (2006.01)
*G09G 5/00* (2006.01)
*G09G 5/02* (2006.01)
*H04N 13/04* (2006.01)

(52) U.S. Cl.
CPC .............................. *H04N 13/0456* (2013.01)

(58) Field of Classification Search
CPC ....... H04N 13/0456; H04N 7/181; H04N 7/18
See application file for complete search history.

(56) References Cited

U.S. PATENT DOCUMENTS

| | | | |
|---|---|---|---|
| 5,615,318 A * | 3/1997 | Matsuura | A41H 3/007 345/419 |
| 6,084,979 A | 7/2000 | Kanade et al. | |
| 6,154,251 A | 11/2000 | Taylor | |
| 6,535,226 B1 | 3/2003 | Sorokin et al. | |
| 6,556,201 B1 * | 4/2003 | Maehara | G06T 15/205 345/427 |
| 6,791,542 B2 | 9/2004 | Matusik et al. | |
| 6,983,064 B2 | 1/2006 | Song | |
| 7,035,453 B2 | 4/2006 | Liu | |
| 7,075,661 B2 * | 7/2006 | Petty | G01S 17/875 356/603 |
| 7,106,361 B2 | 9/2006 | Kanade et al. | |
| 7,538,774 B2 * | 5/2009 | Kunita | G06T 7/593 345/581 |
| 7,583,815 B2 | 9/2009 | Zhang et al. | |

(Continued)

FOREIGN PATENT DOCUMENTS

WO    WO 2000/58913    10/2000

OTHER PUBLICATIONS

USPTO Office Action for U.S. Appl. No. 13/835,887, dated Jan. 30, 2014.

(Continued)

*Primary Examiner* — Sath V Perungavoor
*Assistant Examiner* — Philip Dang
(74) *Attorney, Agent, or Firm* — Lowenstein Sandler LLP

(57) ABSTRACT

Generating 3D content is described. A method includes identifying a group of videos of an event. The method includes detecting a first reference point in a first video and a second video from the group of videos. The method also includes creating a first three dimensional video frame based on a first video frame of the first video and a second video frame of the second video using the first reference point. The method further includes creating a second three dimensional video frame based on a third video frame of the first video and a fourth video frame of the second video using a second reference point. The method includes creating a three dimensional video by combining the first three dimensional frame and the second three dimensional frame in a sequential order based on respective timestamps of the first three dimensional frame and the second three dimensional frame.

19 Claims, 5 Drawing Sheets

(56) References Cited

U.S. PATENT DOCUMENTS

| | | | |
|---|---|---|---|
| 7,594,177 B2 * | 9/2009 | Jojic | G06F 17/30852 |
| | | | 715/720 |
| 7,595,816 B1 | 9/2009 | Enright et al. | |
| 7,884,848 B2 | 2/2011 | Ginther | |
| 7,903,048 B2 * | 3/2011 | Yanagisawa | G01C 21/36 |
| | | | 345/7 |
| 7,991,778 B2 * | 8/2011 | Hull | G06K 9/00442 |
| | | | 707/741 |
| 8,060,908 B2 | 11/2011 | Bountour et al. | |
| 8,072,503 B2 * | 12/2011 | Tischer | H04N 5/235 |
| | | | 348/47 |
| 8,125,481 B2 | 2/2012 | Gossweiler, III et al. | |
| 8,204,229 B2 | 6/2012 | Arcas et al. | |
| 8,270,704 B2 | 9/2012 | Kim et al. | |
| 8,462,198 B2 | 6/2013 | Lin et al. | |
| 8,508,580 B2 * | 8/2013 | McNamer | H04N 13/0221 |
| | | | 348/43 |
| 8,564,661 B2 * | 10/2013 | Lipton | G08B 13/19608 |
| | | | 348/143 |
| 8,570,376 B1 * | 10/2013 | Sharma | H04N 7/18 |
| | | | 348/159 |
| 8,633,968 B2 * | 1/2014 | Kennedy | H04N 13/0235 |
| | | | 348/43 |
| 2005/0088515 A1 | 4/2005 | Geng | |
| 2011/0050929 A1 | 3/2011 | Lee et al. | |
| 2011/0255775 A1 * | 10/2011 | McNamer | H04N 13/0221 |
| | | | 382/154 |
| 2012/0106801 A1 * | 5/2012 | Jackson | G08G 1/0175 |
| | | | 382/105 |
| 2012/0113111 A1 * | 5/2012 | Shiki | A61B 8/08 |
| | | | 345/419 |
| 2013/0010079 A1 * | 1/2013 | Zhang | H04N 13/0207 |
| | | | 348/47 |
| 2013/0176438 A1 * | 7/2013 | Mate | H04N 7/181 |
| | | | 348/157 |
| 2013/0278501 A1 * | 10/2013 | Bulzacki | G06F 3/017 |
| | | | 345/157 |
| 2013/0278631 A1 * | 10/2013 | Border | G02B 27/017 |
| | | | 345/633 |
| 2013/0278727 A1 | 10/2013 | Tamier et al. | |
| 2013/0314510 A1 * | 11/2013 | Endo | G03B 35/08 |
| | | | 348/49 |
| 2014/0028780 A1 * | 1/2014 | Croen | H04N 21/42203 |
| | | | 348/14.03 |
| 2014/0028806 A1 * | 1/2014 | Endo | H04N 13/0217 |
| | | | 348/49 |
| 2014/0100900 A1 * | 4/2014 | Abhyanker | H04L 67/18 |
| | | | 705/5 |
| 2014/0136414 A1 * | 5/2014 | Abhyanker | G06Q 50/28 |
| | | | 705/44 |
| 2014/0143061 A1 * | 5/2014 | Abhyanker | G06Q 50/01 |
| | | | 705/14.58 |
| 2014/0180914 A1 * | 6/2014 | Abhyanker | G01C 1/00 |
| | | | 705/39 |
| 2014/0186010 A1 * | 7/2014 | Guckenberger | G11B 27/031 |
| | | | 386/248 |
| 2014/0198954 A1 * | 7/2014 | Bulzacki | G06K 9/00342 |
| | | | 382/103 |
| 2014/0237365 A1 * | 8/2014 | Oberbrunner | G11B 27/34 |
| | | | 715/722 |
| 2014/0240363 A1 * | 8/2014 | Hong | G06F 3/012 |
| | | | 345/684 |

OTHER PUBLICATIONS

USPTO Office Action for U.S. Appl. No. 13/835,887, dated Jul. 31, 2013.

Wilburn, et al., "High Performance Imaging Using Large Camera Arrays", ACM Transactions on Graphics 24.3 (2005): 765-776. (Retrieved on Nov. 14, 2012 from: http://graphics.stanford.edu/papers/CameraArray/CameraArray_Sig05.pdf ).

David Shaman, "SceneNet turns mobile video clips into (almost) live, 3D events," SceneNet, May 12, 2014.

Puneet Jain et al., "Focus: Clustering Crowdsourced Videos by Line-of-Sight," SenSys '13, Nov. 11-15, 2013.

Guanfeng Want et al., "Active key frame selection for 3D model reconstruction from crowdsourced geo-tagged videos," 15th IEEE International Conference on Multimedia & Expo (ICME 2014), 2014.

Shamah, D. (May 12, 2014). SceneNet turns mobile video clips into (almost) live, 3D events. Retrieved from www.timesofisrael.com on Feb. 13, 2017. 2 pages.

* cited by examiner

GENERATING A 3D VIDEO OF AN EVENT USING CROWD SOURCED DATA

TECHNICAL FIELD

Implementations of the present disclosure relate to providing content, and more specifically, to generating a three dimensional (3D) video of an event using crowd sourced data.

BACKGROUND

The Internet allows people to obtain information, connect with others and share information with each other. Common Internet destinations include online news services, content sharing platforms, social networking platforms, and the like. Many services and platforms include a content sharing aspect that allows users to discover, upload, view, and share media items, such as video content, image content, audio content, and so on. Other users may comment on the shared content, discover new content, locate updates, share additional content, and otherwise interact with the provided content. The shared media items may include content from professional content creators, e.g., creators of movies, music, and articles, as well as media items from amateur content creators, e.g., creators of video and photo blogging, short original videos, and status updates.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, a method includes identifying, from a plurality of videos by a processing device, a group of videos of an event. Each video of the group of videos includes a plurality of video frames. The method further includes detecting a first reference point in a first video and a second video from the group of videos. The method further includes creating a first three dimensional video frame based on a first video frame of the first video and a second video frame of the second video using the first reference point. The method further includes creating a second three dimensional video frame based on a third video frame of the first video and a fourth video frame of the second video using a second reference point. The method further includes creating a three dimensional video by combining the first three dimensional frame and the second three dimensional frame in a sequential order based on respective time stamps of the first three dimensional frame and the second three dimensional frame.

In additional implementations, computing devices for performing the operations of the above described implementations are also disclosed. Additionally, in implementations of the disclosure, a computer readable storage media stores methods for performing the operations of the above described implementations. Further, in implementations of the disclosure, means for performing the operations of the above described implementations are also disclosed.

BRIEF DESCRIPTION OF THE DRAWINGS

The present disclosure is illustrated by way of example, and not by way of limitation, in the figures of the accompanying drawings.

DETAILED DESCRIPTION

Video and photos taken at an event are often spread across many devices, and a user can typically only see one view point at a time and is usually limited by the device used for that specific video. Conventional systems generally do not make it possible to combine videos taken at the event in an efficient manner in order to allow attendees (or other interested parties) to see the event from different angles. Implementations of the present disclosure address these and other shortcomings of conventional systems and techniques by providing a mechanism for generating a three dimensional (3D) video of an event using crowd sourced data.

According to some aspects of the present disclosure, a computer system determines that a set of media items are of the same event (e.g., a wedding, a sports event, an everyday scene, etc.) based on the time and location of the media items (e.g., when timestamps and geo-location stamps of the media items match, within suitable thresholds). For example, if two media items have respective timestamps of 2:03-3:05 pm and 2:01-2:56 pm and their geo-location stamps are within 20 meters of each other, then the computer system might identify the two media items as being of the same event. As another example, two media items that have respective timestamps of 10:20-10:52 am and 10:30-10:40 am and respective geo-location stamps within 10 meters of each other might also be identified as being of the same event.

According to some aspects of the present disclosure, the computer system combines the above media items of the same event by matching objects and points in each media item to determine from which angle and distance the media items were captured. Using this information, the computer system can then build a 3D animated representation of the media items. Each media item has multiple frames. The computer system uses the frames of each media item to create 3D frames. The computer system then combines the 3D frames to form a 3D video.

As a result, the computer system can create an event animation that can be viewed from most angles within the range of angles used for capturing the media items of the event. The resulting 3D video can then be published as an event for attendees and other interested parties to watch. Users whose videos were used for creating the 3D video can be notified of the new 3D video, and those users can then re-watch the event from a new perspective. Various other uses of the resulting 3D videos are possible as well.

The present disclosure often references videos for simplicity and brevity. However, the teaching of the present disclosure are applied to media item instances generally and can be applied to various types of content or media item instances, including for example, video, audio, text, images, program instructions, etc.

Figure 1:
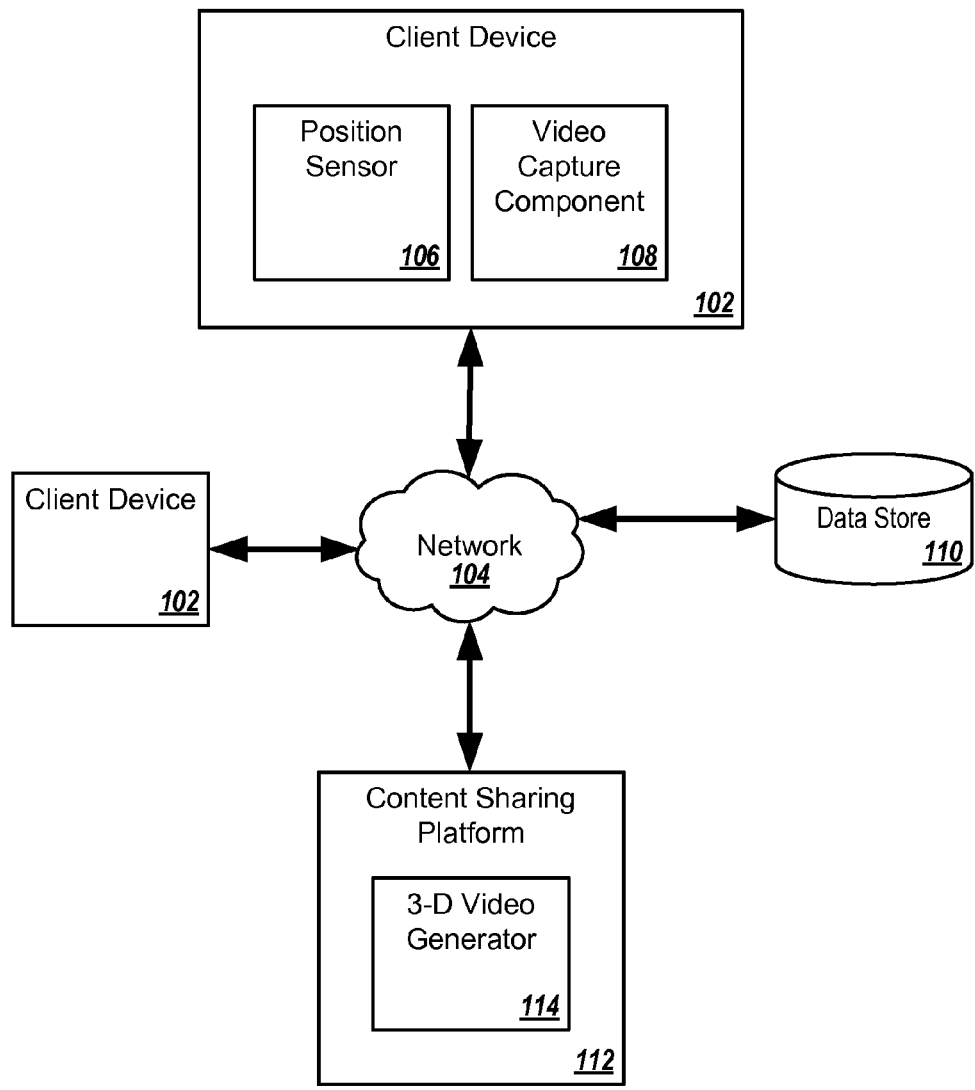
FIG. 1 illustrates an example system architecture, in accordance with one implementation of the disclosure.

FIG. 1 illustrates an example system architecture 100, in accordance with one implementation of the disclosure, for generating a 3D video of an event using crowd sourced data. The system architecture 100 includes any number of client devices 102, a network 104, a data store 110, and a content sharing platform 112.

The one or more client devices 102 may each include computing devices such as personal computers (PCs), laptops, mobile phones, smart phones, tablet computers, cameras, video cameras, netbook computers etc. In some implementations, client device 102 may also be referred to as "user devices." The client device 102 can run an operating system (OS) that manages hardware and software of the client device 102. The client device 102, the OS, and modules within the OS can perform various operations, such as facilitating content capture. An application (not shown) may run on the client machines (e.g., on the OS of the client machines). The application may be a web browser that can access content served by a web server. The application may issue image and/or video search queries to the web server or may browse images and/or videos that have previously been classified. The application may also be a media capture application, such as a photo or video app of a mobile device. Using the application, a user can use the client device 102 to record audio and video. The client device 102 may also upload images and/or video to the web server (e.g., content sharing platform 112) for storage, classification and/or generation of 3D video.

The client device 102 can include one or more position sensors 106 (e.g., Global Positioning System (GPS)) and video capture component 108 (e.g., a charge coupled device (CCD) image sensor, a complimentary metal oxide semiconductor (CMOS) image sensor, etc.). The position sensor 106 and the video capture component 108 may work together when capturing video. For example, when the video capture component 108 records a video, the position sensor 106 may identify a geographic position of the client device 102, which may then be associated with the recorded video. This is sometimes referred to as "geo-tagging" where subsequent viewers of the recorded video can also see the geographic location where the video was recorded. The video capture component 108 can also associate a timestamp with a recorded video, where the timestamp indicates when the recorded video was captured. The functionality of one or more of the position sensor 106 and content capture component 108 may be combined into a single module, or may be divided into additional modules.

In one implementation, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Figure 2:
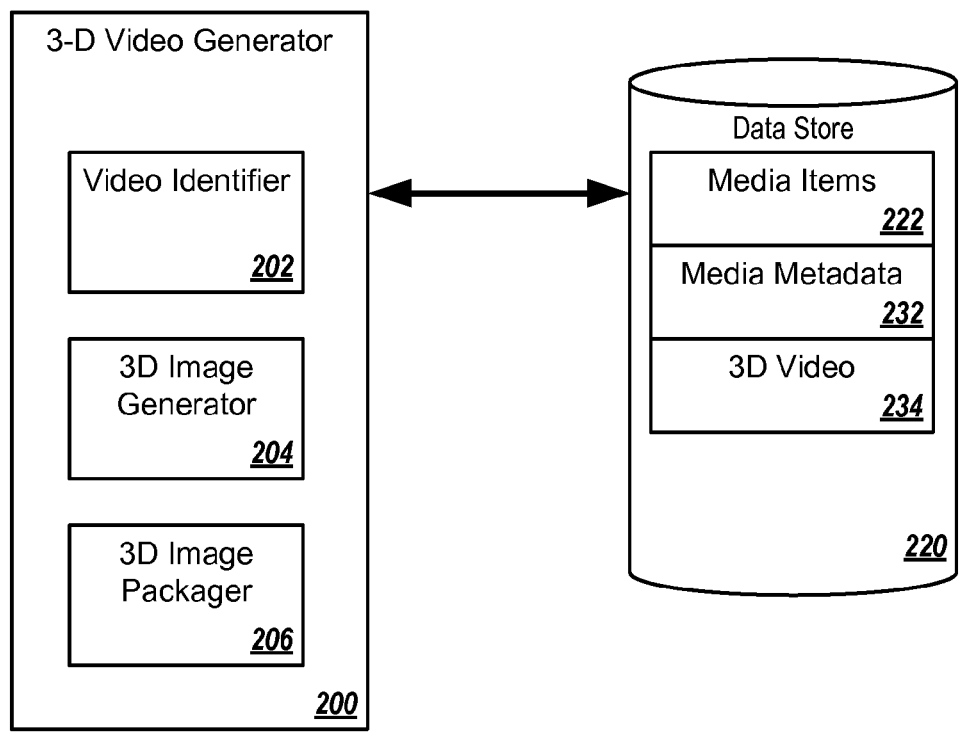
FIG. 2 is a block diagram illustrating a system for generating a three dimensional (3D) video of an event using crowd sourced data, according to some implementations of the disclosure.

Data store 110 is a persistent storage that is capable of storing media items (e.g., videos, images, audio clips, text-based documents, etc.), media metadata to tag, organize, and index the media items, as well as 3D videos, as further described in conjunction with FIG. 2. In one implementation, the data store 110 may be a memory (e.g., random access memory), a cache, a drive (e.g., a hard drive), a flash drive, a database system, or another type of component or device capable of storing data. The data store 110 may also include multiple storage components (e.g., multiple drives or multiple databases) that may also span multiple computing devices (e.g., multiple server computers).

The content sharing platform 112 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 112 may allow a user to consume, upload, search for, approve of ("like"), disapprove of ("dislike"), and/or comment on media items. The content sharing platform 112 may also include a website (e.g., a webpage) that may be used to provide a user with access to the media items such as 3D videos. Content sharing platform 112 may include any type of content delivery network providing access to content and/or media items and can include a social network, a news outlet, a media aggregator, a chat service, a messaging platform, and the like. Implementations of the disclosure are not limited to content sharing platforms or to platforms that provide channel subscriptions to users.

The content sharing platform 110 includes a 3D video generator 114. The 3D video generator 114 identifies a group of videos of an event at a particular time and location. After identifying the group of videos, the 3D video generator 114 uses the group of videos to create a 3D video. Further details relating to some aspects of 3D video generation are described in conjunction with FIG. 2.

In situations in which the systems discussed herein collect personal information about users, or may make use of personal information, the users may be provided with an opportunity to control whether the content sharing platform 110 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 110.

FIG. 2 is a block diagram of one embodiment of a 3D video generator 200. The 3D video generator 200 may be the same as the 3D video generator 114 of FIG. 1 and may include a video identifier 202, a 3D image generator 204, and a 3D image packager 206. The 3D video generator 200 may be coupled to a data store 220. The components can be combined together or separated in further components, according to a particular embodiment.

The video identifier 202 identifies groups of media items 222 that are part of a same event. The video identifier 202 can search for media items 222 in the data store 220. The media items 222 can be indexed and searchable. For example, metadata of each media item 222 can be indexed and the video identifier 202 can search the indexed metadata. The video identifier 202 identifies groups of media items 222 in data store 220 that are "related"—i.e., whose timestamps are within a time threshold of each other, and whose geolocation stamps are within a distance threshold of each other—and stores information about these groups as media metadata 232 for rapid retrieval (e.g., as rows of a table in a relational database, as sets in an object-oriented database, etc.). In some embodiments, the time and distance thresholds may be established by a system administrator, while in some other embodiments such thresholds may be hard-coded into logic contained in video identifier 202, while in still some other embodiments these thresholds may be determined individually for each group by video identifier 202, based on criteria such as the geolocation associated with the group (e.g., a distance threshold in Manhattan might be smaller than a distance threshold in a small town), the time associated with the group (e.g., a time threshold of a lecture might be smaller than a time threshold of a wedding), and so forth, as well as possibly dynamic criteria such as the number of video clips in the group, metadata tags applied to video clips, etc.

In some embodiments, the video identifier 202 is given information that an event has occurred and the video identifier 202 then identifies videos related to the event. For example, the video identifier 202 can query a database (e.g., data store 220) for media items 222 that have metadata that correspond to the event.

In other embodiments, the video identifier 202 can infer the likely occurrence of an event when a it identifies a threshold number of videos for an event. In some embodiments, the threshold number may be established by a system administrator, while in some other embodiments the threshold may be hard-coded into logic contained in the video identifier 202, while in still some other embodiments the size threshold may be determined individually for each group by the video identifier 202, based on criteria such as the time associated with a group of video clips (e.g., the size threshold might be lower at 1:00 am than 1:00 pm), the geolocation associated with a group of video clips (e.g., the size threshold might be higher in midtown Manhattan than in a small town), and so forth.

The 3D image generator 204 creates 3D images using the videos in the group. Each of the videos of the group includes multiple video frames, and the 3D image generator 204 can combine the video frames from different videos to create a 3D frame (e.g., a 3D image). To create the 3D frame, the 3D image generator 204 identifies reference points in the videos in the group. A reference point can be any similarity between two videos, such as video content, audio content and/or metadata. For example, a similarity can be a face of a lead singer of a rock band at a rock concert, a song, or a timestamp associated with a video frame. In some embodiments, media items were captured using specialized camera imaging that uses infrared imaging for calculating distances during the 3D render. For example, the infrared imaging may provide additional data and/or different reference points that can be used to create 3D videos. When the 3D image generator 204 detects a similar reference point in two or more videos in the group, the 3D image generator 204 can merge the videos together. In some embodiments, the 3D image generator 204 merges the videos together on a frame-by-frame basis to create a 3D video frame that corresponds to each video frame. When merging the video frames, the 3D image generator 204 can use the reference points and infer geometry based on the different viewpoints depicted in the different videos to create the 3D image. For example, when a reference point is a lead singer's face, the 3D image generator 204 can analyze the geometry of the lead singer's face and infer contours of the face, such as the lead singer's nose, mouth, etc. The 3D image generator 204 can also use the reference points in conjunction with geographical information (e.g., a geotag associated with the video) to determine from which angle and distance the videos were taken, which may also help create the 3D image. For example, when two videos are taken of the lead singer from different vantage points/angles, the 3D image generator 204 can use the two different vantage points/angles to infer geometry of the lead singer because the different vantage points/angles provide the 3D image generator 204 with additional information about the size, shape, colors, and overall geometry of the lead singer's face. For example, the 3D image generator 204 can identify the lead singer's nose from two or more angles, and based on how the nose is represented in each video, the 3D image generator 204 can create a 3D geometrical representation of the lead singer's nose. When two videos have different frame rates, the 3D image generator 204 can use the video with a higher frame rate and extrapolate frames for the video with the lower frame rate. Alternatively, the 3D image generator 204 can downsample the video with the higher frame rate such that it has the same frame rate as the video with the lower frame rate. The 3D image generator 204 can store the 3D video frames as 3D video 234 in the data store 220.

In some embodiments, the group of videos include videos do not have the same start time. For example, when the videos in the group are for a rock concert event, a first video may start during an interlude and may continue during a song. A second video may start just after the band started playing the song. Both videos are for the same song so the 3D image generator 204 may combine the two videos into a 3D video. When creating the 3D video, the 3D image generator 204 may define a timeline and may group the videos on the timeline. To group the videos in the timeline, the 3D image generator 204 may define sequential time points along the timeline. Frames may be collected at each of the time points. For example, 50 frames from 50 different videos can be collected at a single time point. Then, the 3D image generator 204 may identify reference points for each video at the time point. The reference points may be video or audio. For example, a reference point can be when the singer starts singing the chorus for the first time. The videos can be organized according to these reference points. When two or more videos share a reference point, the image generator 204 may generate a 3D video frame for that reference point on the timeline using video frames associated with that specific reference point.

In some implementations, the 3D image packager 206 creates a 3D video by combining two or more 3D video frames that were created by the 3D image generator 204. The 3D image packager 206 can combine multiple 3D video frames in a sequential order according to their respective timestamps to create a 3D video. The resulting 3D video may be viewed from most angles within the range and angles that the source videos were taken. In some embodiments, the 3D image packager 206 packages the 3D video frames into a readable package format (e.g., mp4, mkv, avi). Once the 3D image packager 206 creates the 3D video 234, the 3D image packager 206 can store the 3D video 234 in the data store 220. In some embodiments, the 3D video generator 200 may provide the 3D video 234 via a content sharing platform (e.g., content sharing platform 112 of FIG. 1).

Figure 3:
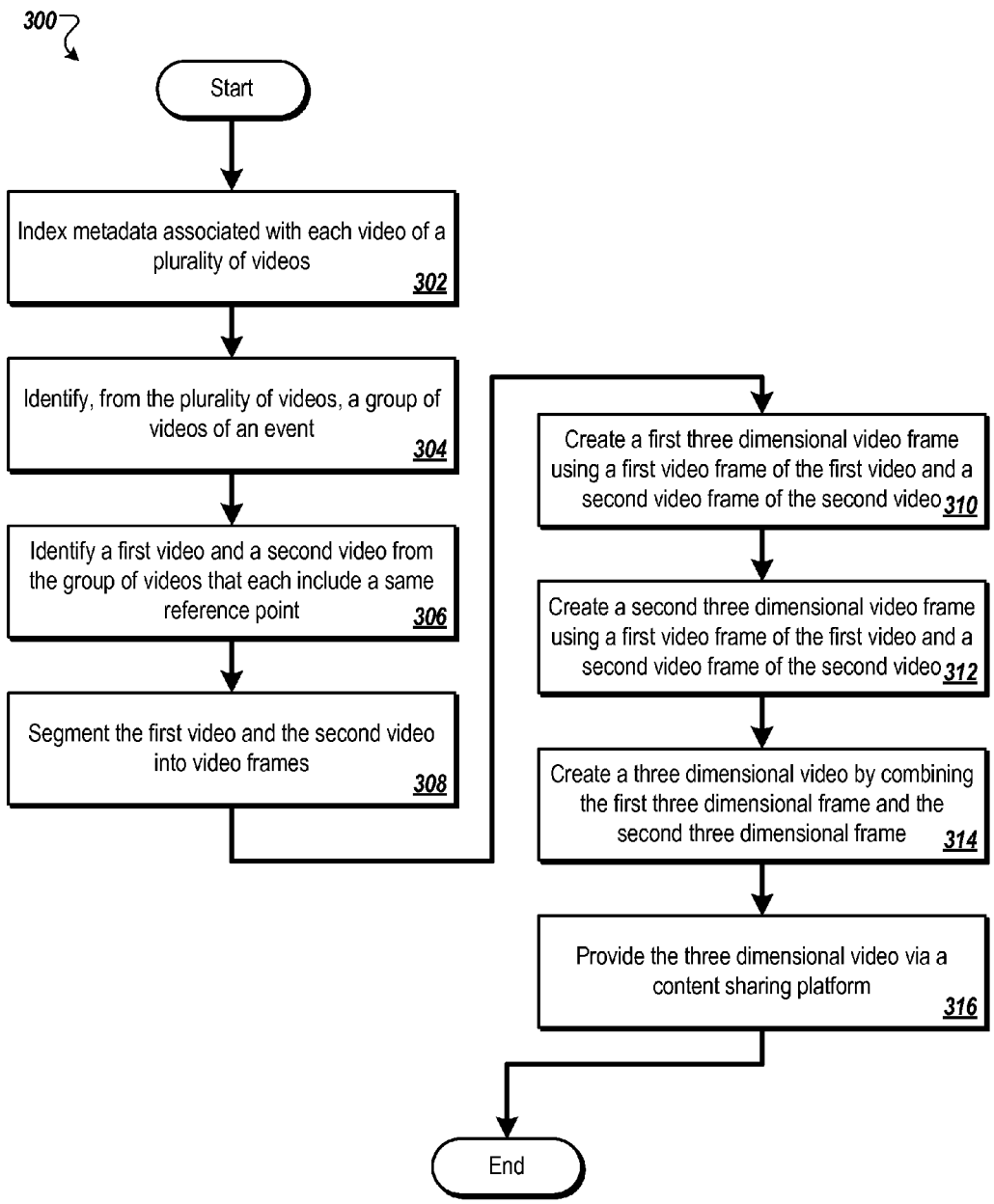
FIG. 3 is a flow diagram illustrating a method for generating a 3D video of an event using crowd sourced data, according to some implementations of the disclosure.

FIG. 3 is a flow diagram illustrating a method 300 for generating a 3D video of an event using crowd sourced data, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by the 3D video generator 114 of FIG. 1.

Referring to FIG. 3, method 300 begins at block 302 when processing logic indexes metadata associated with each video of a plurality of videos. In some embodiments, the processing logic indexes the metadata by receiving media items from one or more sources, such as a client device, web scraping, a user upload, etc. Once the processing logic receives a media item, it can identify metadata associated with the media item. The metadata can include geolocation, a timestamp, a range of timestamps (e.g., video start time and end time), user-generated tags (e.g., any additional information that a user may desire to associate with a video, such as a user-generated location, name of the event or video, an identity of other individuals who attended the event), etc. The processing logic can create and update an index of the metadata and can store the index in a data store that can be accessed to create 3D videos.

At block 304, the processing logic identifies, from the plurality of videos (e.g., using the metadata index), a group of videos of an event. In some embodiments, when identifying the group of videos of the event, the processing logic identifies a time and geographic location of the event and then identifies the group of videos based on the time and location of the event in the metadata of the respective videos.

At block 306, the processing logic identifies a first reference point in a first video and a second video from the group of videos, as described herein. At block 308, the processing logic segments the first video and the second video into video frames. The video frames can be grouped according to their respective reference points such that video frames with similar reference points are grouped together.

At block 310, the processing logic creates a first 3D video frame based on a first video frame of the first video and a second video frame of the second video using the first reference point (the first video's frame corresponding to the first reference and the second video's frame corresponding to the first reference point), as described herein. At block 312, the processing logic creates a second 3D video frame based on a third video frame of the first video and a fourth video frame of the second video using a second reference point (the first video's frame corresponding to the second reference and the second video's frame corresponding to the second reference point) in a similar manner used to create the first 3D video frame. In an example, the first 3D video frame is created using multiple videos that share a similar first time stamp. Similarly, the second 3D video frame is created using multiple videos that share a similar second time stamp.

Figure 4:
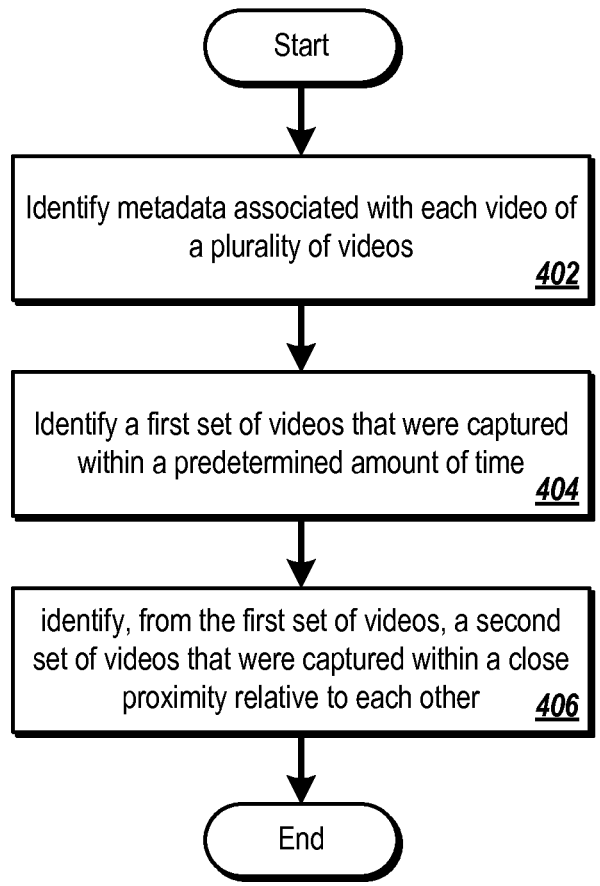
FIG. 4 is a flow diagram illustrating a method for identifying videos of an event, according to some implementations of the disclosure.

At block 314, the processing logic creates a three dimensional video by combining the first 3D frame and the second 3D frame in a sequential order based on respective timestamps of the first 3D frame and the second 3D frame. In some embodiments, the processing logic packages the first 3D frame and the second 3D frame in a readable common package format, as described herein. At block 316, the processing logic provides the 3D video via a content sharing platform FIG. 4 is a flow diagram illustrating a method 400 for identifying videos of an event, according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

Referring to FIG. 4, method 400 begins at block 402 when processing logic identifies metadata associated with each video of a plurality of videos. The processing logic can identify the metadata by accessing an index of a large amount of videos. For example, the metadata can be a timestamp and/or a geolocation associated with each video.

At block 404, the processing logic identifies a first set of videos that were captured within a predetermined amount of time. For example, when searching for an event that lasted for two hours, the processing logic can identify all videos that were captured within those two hours. In one embodiment, the predetermined amount of time is specified by a system administrator or another individual who requests generation of the 3D video. In another embodiment, the processing logic determines the predetermined amount of time by analyzing a group of videos. When a threshold number of videos are created within a short amount of time, the processing logic determines the predetermined amount as a range of time that includes most or all of the threshold number of videos are were created within the short amount of time.

At block 404, the processing logic identifies, from the first set of videos, a second set of videos that were captured within a close geographical proximity relative to each other. For example, when the two-hour event described in conjunction with block 404 was at a specific geographical location, the processing logic can identify videos taken within those two hours and that also were taken at the specific geographical location. Once the processing logic identifies the second set of videos, the processing logic can provide the second set of videos to a 3D video generator, such as the 3D video generator 114 of FIG. 1.

Figure 5:
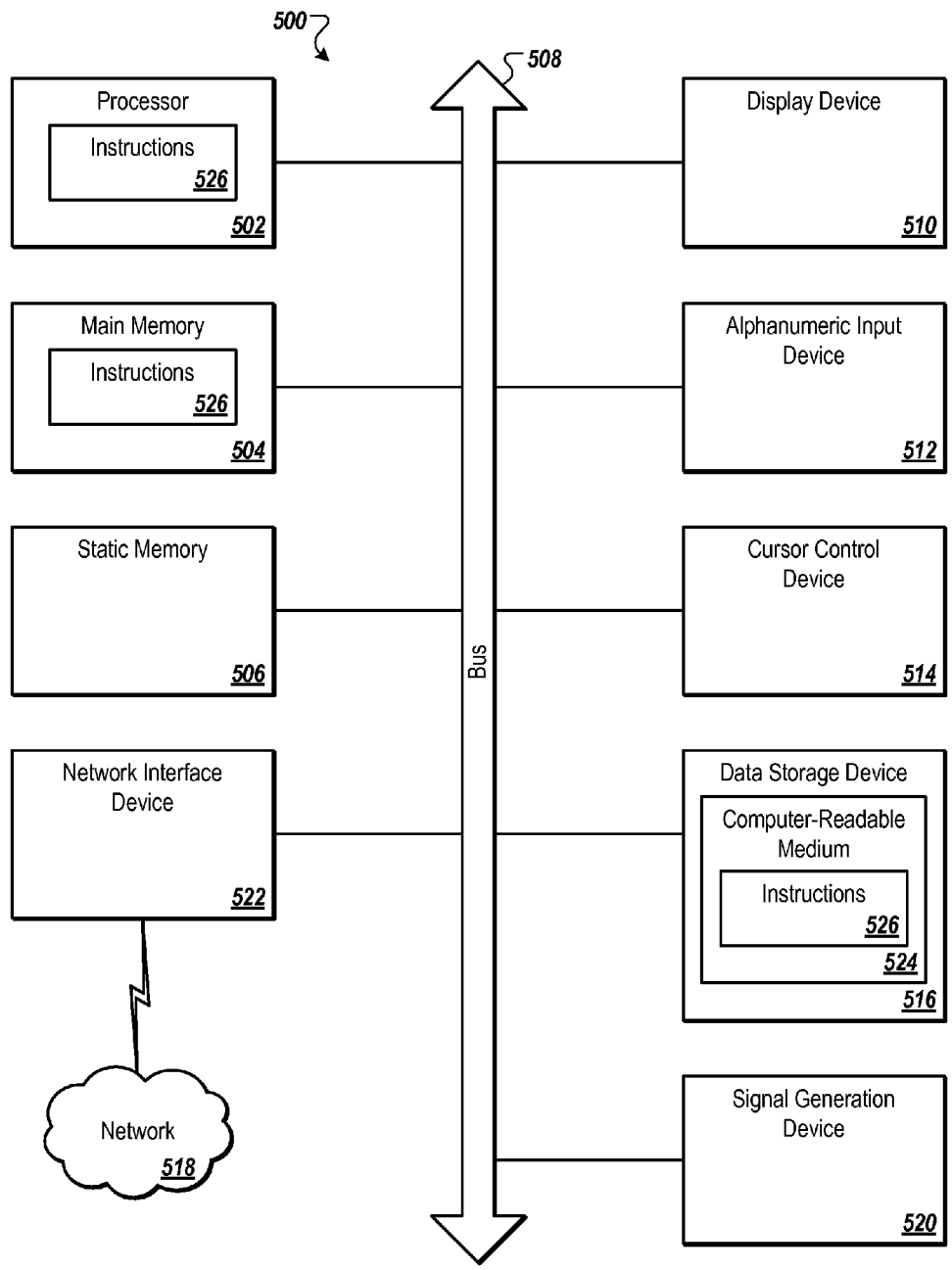
FIG. 5 is a block diagram illustrating an example computer system, according to some implementations.

FIG. 5 illustrates a diagrammatic representation of a machine in the example form of a computer system 500 within which a set of instructions, for causing the machine to perform any one or more of the operations or methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the operations or methodologies discussed herein.

The example computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and methodologies discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 518 via the network interface device 522.

In one implementation, the instructions 526 include instructions for generating 3D content, which may correspond, respectively, to the 3D video generator 114 with respect to FIG. 1, and/or a software library containing methods that provide one or more dynamic media players player for a content sharing platform. While the computer-readable storage medium 524 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "presenting", "scrolling", "determining", "enabling", "preventing," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an implementation" or "one implementation" throughout is not intended to mean the same implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, from a plurality of videos and by a processing device, a group of videos of an event from a plurality of users, wherein each video of the group of videos comprises a plurality of video frames;
   detecting a first reference point in a first video and a second video from the group of videos that are from the plurality of users, the first reference point corresponding to a similarity in audio content of the first video and the second video;
   creating a first three dimensional video frame based on a first video frame of the first video and a second video frame of the second video using a respective viewpoint associated with the first reference point from each of the first video frame and the second video frame;
   creating a second three dimensional video frame based on a third video frame of the first video and a fourth video frame of the second video using a second reference point;
   creating a three dimensional video by combining the first three dimensional video frame and the second three dimensional video frame in a sequential order based on respective timestamps of the first three dimensional video frame and the second three dimensional video frame; and
   providing a notification to a respective user of the plurality of users indicating that the first video or the second video from the group of videos that is from the respective user has been used to create the three dimensional video.

2. The method of claim 1, wherein identifying, from the plurality of videos, the group of videos of the event comprises:
   identifying metadata associated with each video of the plurality of videos; and
   determining that the group of videos is associated with the event based on a threshold number of videos having metadata associated with a time and location, and wherein the threshold number is defined by the time and location of the event.

3. The method of claim 2, wherein determining that the group of videos is associated with the event comprises:
   identifying a first set of videos that were captured within a predetermined amount of time; and
   identifying, from the first set of videos, a second set of videos that were captured within a close proximity relative to each other.

4. The method of claim 2 further comprising indexing the metadata associated with each video of the plurality of videos before determining that the group of videos is associated with the event, wherein determining that the group of videos is associated with the event comprises identifying, in the index, the threshold number of videos that have metadata associated with the time and location.

5. The method of claim 1 wherein identifying, from the plurality of videos, the group of videos of the event comprises:
   identifying a time and location of the event; and
   identifying the group of videos based on the time and location of the event.

6. The method of claim 1 further comprising segmenting the first video and the second video into video frames.

7. The method of claim 1 further comprising providing the three dimensional video via a content sharing platform.

8. The method of claim 1, wherein each video of the group of videos was captured by a user device at the event.

9. The method of claim 1, wherein the first reference point is the same as the second reference point.

10. An apparatus comprising:
    a memory; and
    a processing device, communicably coupled to the memory, the processing device to execute instructions to:
    identify, from a plurality of videos, a group of videos of an event from a plurality of users, wherein each video of the group of videos comprises a plurality of video frames;
    detect a first reference point in a first video and a second video from the group of videos that are from the plurality of users, the first reference point corresponding to a similarity in audio content of the first video and the second video;
    create a first three dimensional video frame based on a first video frame of the first video and a second video frame of the second video using a respective viewpoint associated with the first reference point from each of the first video frame and the second video frame;
    create a second three dimensional video frame based on a third video frame of the first video and a fourth video frame of the second video using a second reference point;
    create a three dimensional video by combining the first three dimensional video frame and the second three dimensional video frame in a sequential order based on respective timestamps of the first three dimensional video frame and the second three dimensional video frame; and
    provide a notification to a respective user of the plurality of users indicating that the first video or the second video from the group of videos that is from the respective user has been used to create the three dimensional video.

11. The apparatus of claim 10, wherein when identifying, from the plurality of videos, the group of videos of the event, the processing device is to:
    identify metadata associated with each video of the plurality of videos; and
    determine that the group of videos is associated with the event based on a threshold number of videos having metadata associated with a time and location, and wherein the threshold number is defined by the time and location of the event.

12. The apparatus of claim 11, wherein when determining that the group of videos is associated with the event, the processing device is to:
identify a first set of videos that were captured within a predetermined amount of time; and
identify, from the first set of videos, a second set of videos that were captured within a close proximity relative to each other.

13. The apparatus of claim 10, wherein when identifying, from the plurality of videos, the group of videos of the event, the processing device is to:
identify a time and location of the event; and
identify the group of videos based on the time and location of the event.

14. A non-transitory machine-readable storage medium storing instructions which, when executed, cause a processing device to perform operations comprising:
identifying, from a plurality of videos, a group of videos of an event from a plurality of users, wherein each video of the group of videos comprises a plurality of video frames;
detecting a first reference point in a first video and a second video from the group of videos that are from the plurality of users, the first reference point corresponding to a similarity in audio content of the first video and the second video;
creating a first three dimensional video frame based on a first video frame of the first video and a second video frame of the second video using a respective viewpoint associated with the first reference point from each of the first video frame and the second video frame;
creating a second three dimensional video frame based on a third video frame of the first video and a fourth video frame of the second video using a second reference point;
creating a three dimensional video by combining the first three dimensional video frame and the second three dimensional video frame in a sequential order based on respective timestamps of the first three dimensional video frame and the second three dimensional video frame; and
providing a notification to a respective user of the plurality of users indicating that the first video or the second video from the group of videos that is from the respective user has been used to create the three dimensional video.

15. The non-transitory machine-readable storage medium of claim 14, wherein to identify, from the plurality of videos, the group of videos of the event, the operations further comprise:
identifying metadata associated with each video of the plurality of videos; and
determining that the group of videos is associated with the event based on a threshold number of videos having metadata associated with a time and location, and wherein the threshold number is defined by the time and location of the event.

16. The non-transitory machine-readable storage medium of claim 15, wherein to determine that the group of videos is associated with the event, the operations further comprise:
identifying a first set of videos that were captured within a predetermined amount of time; and
identifying, from the first set of videos, a second set of videos that were captured within a close proximity relative to each other.

17. The non-transitory machine-readable storage medium of claim 15, wherein the operations further comprise:
indexing the metadata associated with each video of the plurality of videos before determining that the group of videos is associated with the event, wherein determining that the group of videos is associated with the event comprises identifying, in the index, the threshold number of videos that have metadata associated with the time and location.

18. The non-transitory machine-readable storage medium of claim 14, wherein the first reference point is the same as the second reference point.

19. The non-transitory machine-readable storage medium of claim 1, wherein the operations further comprise:
segmenting the first video and the second video into video frames.

* * * * *